United States Patent [19]

Oberlinner et al.

[11] 3,896,126
[45] July 22, 1975

[54] 2-OXO-3 SPIROPYRAN QUINOXALINES

[75] Inventors: Andreas Oberlinner, Mannheim; Hans Baumann, Ludwigshafen; Klaus Grychtol, Bad Durkheim, all of Germany

[73] Assignee: Badische Anilin- & Soda-Fabrik Aktiengesellschaft, Ludwigshafen (Rhine), Germany

[22] Filed: June 21, 1973

[21] Appl. No.: 372,298

[30] Foreign Application Priority Data
June 21, 1972 Germany............................ 2230225

[52] U.S. Cl.... 260/250 Q; 260/240 D; 260/283 CN; 260/288 C; 260/289 C; 260/345.3
[51] Int. Cl............................................ C07d 51/78
[58] Field of Search...... 260/250 Q, 256.4 Q, 345.1, 260/283, 54, 268 PC

[56] References Cited
UNITED STATES PATENTS
3,366,628  1/1968  Wendt et al.................. 260/250 Q OTHER PUBLICATIONS
Habib, Proc. Chem. Soc., (1961), pp. 167–168.

*Primary Examiner*—Donald G. Daus
*Assistant Examiner*—David E. Wheeler
*Attorney, Agent, or Firm*—Johnston, Keil, Thompson & Shurtleff

[57] ABSTRACT

Spiropyrans based on 1,2,3,4-tetrahydroquinoline compounds, a process for their manufacture and their use as dye-forming components in copying processes.

4 Claims, No Drawings

2-OXO-3 SPIROPYRAN QUINOXALINES

This invention relates to spiropyrans of formula I:

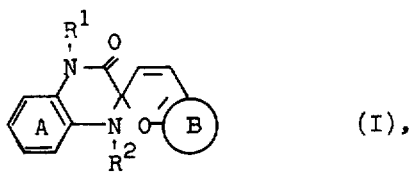

in which
R[1] is hydrogen, alkyl, cyanoalkyl, carboalkoxyalkyl or methoxyalkyl each of from 1 to 6 carbon atoms or phenyl,
R[2] is alkyl of from 1 to 4 carbon atoms,
A is a benzene nucleus optionally substituted by methyl, chlorine, bromine or alkoxy of from 1 to 4 carbon atoms, and
B is a benzene or naphthalene nucleus substituted by chlorine, bromine, nitro, alkyl, alkoxy or dialkylamino having from 1 to 5 carbon atoms in each alkyl group.

The spiropyrans of formula I are compounds having little or no color. When dissolved in non-polar or weakly polar solvents such as hydrocarbons, chlorohydrocarbons and esters, they give intense red to blue colorations when acid substances are added. This reaction, which is also caused by kaolin, zeolites, bentonite, silicic acid and phenolic condensation products, makes the compounds suitable for use as dye-forming components for pressure-sensitive recording materials, particularly copying papers.

Preferred meanings of R[1] are for example hydrogen, methyl, ethyl, cyclohexyl, β-cyanoethyl, β-carbomethoxyethyl and γ-methoxypropyl.

Particularly preferred meanings of R[2] are methyl and ethyl.

The number of substituents on the benzene nucleus A is preferably zero or 1, a particularly preferred substituent being methyl or chlorine in the position 6 or 7.

Preferred examples of substituents on the aromatic nucleus B are chlorine, bromine, methyl, ethyl, t-butyl, methoxy, ethoxy, dimethylamino, diethylamino and carbomethoxy, the number of substituents being preferably 1 or 2.

The spiropyrans of formula I may be conveniently prepared by condensing heterocyclic methylene bases or their salts with o-hydroxybenzaldehydes or o-hydroxynaphthaldehydes via compounds of formula II as illustrated in the scheme below:

the ring closure to the pyran being catalyzed by bases.
Examples of suitable starting materials are as follows:

methylene bases 1-methyl-2-methylene-3-oxo-1,2,3,4-tetrahydroquinoline,
1,4-dimethyl-2-methylene-3-oxo-1,2,3,4-tetrahydroquinoxaline,
1-methyl-4-ethyl-2-methylene-3-oxo-1,2,3,4-tetrahydroquinoxaline,
1-methyl-4-cyclohexyl-2-methylene-3-oxo-1,2,3,4-tetrahydroquinoxaline,
1-methyl-4-(β-cyanoethyl)-2-methylene-3-oxo-1,2,3,4-tetrahydroquinoxaline,
1-ethyl-4-(γ-methoxypropyl)-2-methylene-3-oxo-1,2,3,4-tetrahydroquinoxaline,
1,4-dimethyl-6-chloro-2-methylene-3-oxo-1,2,3,4-tetrahydroquinoxaline,
1-ethyl-6-methyl-2-methylene-3-oxo-1,2,3,4,-tetrahydroquinoxaline,
1-ethyl-7-methyl-2-methylene-3-oxo-1,2,3,4-tetrahydroquinoxaline, and
1-methyl-4-phenyl-2-methylene-3-oxo-1,2,3,4,-tetrahydroquinoxaline;

aldehydes 2-hydroxybenzaldehyde,
5-chlorohydroxybenzaldehyde,
5-bromohydroxybenzaldehyde,
3,5-dichlorohydroxybenzaldehyde,
6-methoxy-2-hydroxybenzaldehyde,
5-t-butyl-2-hydroxybenzaldehyde,
4-dimethylamino-2-hydroxybenzaldehyde,
4-diethylamino-2-hydroxybenzaldehyde,
2-hydroxy-1-naphthaldehyde, and
2-hydroxy-3-carbomethoxy-1-naphthaldehyde.

The condensation of the methylene base with the aldehyde is conveniently carried out in organic solvents such as alcohols, carboxylic acids, carboxylic anhydrides, carboxamides and hydrocarbons and optionally in the presence of acidic or basic condensing agents such as zinc chloride, phosphoric acid, toluenesulfonic acid, boric acid, pyridine, piperidine, triethylamine and ammonium acetate, in amounts usually used for condensation reactions of this kind and under the usual conditions. The ring closure to the pyrane may take place at the same time as or subsequently to the condensation in the same or a separate stage by the action of a base, for example alkali metal hydroxides, sodium carbonate, sodium acetate, ammonia, aliphatic amines or pyridine, in known manner. The crystallized spiropy-

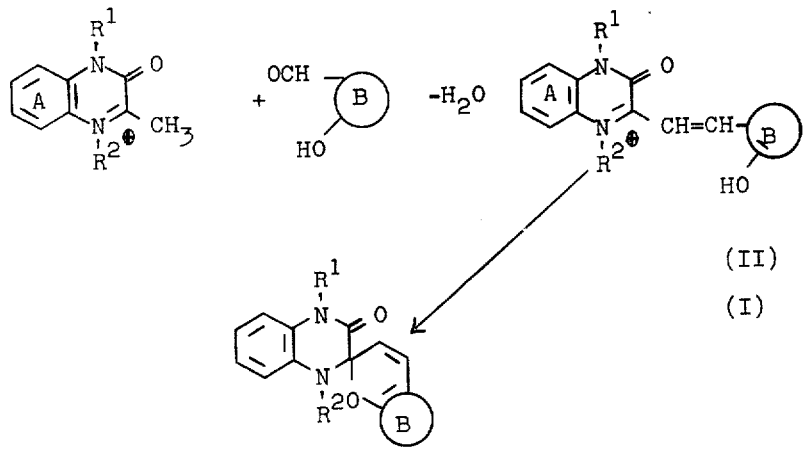

rane compounds precipitated from the solution may then be used in known manner as dye-forming components in copying processes. For example, they may be worked into a paste which is then coated onto paper and overcoated with a protective layer. A particularly advantageous method is to use the dye-forming components in solution in for example chloroparaffin, chloroesters, diphenyl or toluene, and encapsulate the solution in microcapsules, with which the paper surface is then coated. When this layer is pressed (for example by a writing operation) against a surface which has been coated with an acid reacting substance, the dye is developed and fixed.

In the following Examples the parts and percentages are by weight.

EXAMPLE 1

30 parts of 1,2,4-trimethylquinoxalonium-methylsulfate and 14 parts of salicylaldehyde are dissolved in 50 parts of ethanol and mixed with 15 parts of piperidine, whereupon the mixture is heated under reflux for 8 hours. When condensation is complete, the precipitate is filtered off and washed with a little cold ethanol. There are obtained 20 parts of 1,4-dimethyl-3-oxo-spiro[1,2,3,4-tetrahydroquinoxaline-2,2'-(2'H,1')benzopyran] in the form of colorless crystals having a melting point of 174°C.

A solution of this compound in chloroparaffin is enclosed in microcapsules which are coated onto the surface of paper. When this is pressed against an acid reacting layer by a writing operation, a red coloration results.

EXAMPLE 2

60 parts of 1,2,4-trimethylquinoxalonium-methysulfate and 38.6 parts of diethylaminosalicylaldehyde are heated under reflux for 30 minutes in 140 parts of ethanol. The dye which precipitates as crystals on cooling is filtered off and stirred in 1,500 parts of benzene with aqueous ammonia until the color disappears completely. The benzene phase is clarified with activated charcoal, dried over sodium sulfate and concentrated to one fifth of its original volume. The reaction product is precipitated from the benzene solution by the addition of 500 parts of light naphtha to give 53 parts of 1,4-dimethyl-3-oxo-7'-diethylamino-spiro[1,2,3,4,-tetrahydroquinoxaline-2,2'-(2'H,1')benzopyrane], m.p. 152°–154°C. Microcapsules containing the above compound dissolved in chlorinated diphenyl give a bluish violet coloration when ruptured by a writing operation.

EXAMPLE 3

15 parts of 1,2,4-trimethylquinoxalonium-methylsulfate and 7.6 parts of o-vanillin-3-methoxy-(2-hydroxybenzaldehyde) are heated under reflux in 50 parts of ethanol for 1 hours. The dye is isolated and stirred with ammonia and benzene as described in Example 2 until the color disappears completely. Addition of light petroleum to the concentrated benzene solution gives 1,4-dimethyl-3-oxo-8'-methoxy-spiro[1,2,3,4,-tetrahydroquinoxaline-2,2'-(2'H,1')-benzopyran] in the form of colorless cyrstals having a melting point of 190°–192°C.

Microcapsules containing a solution of the above compound give a red coloration when pressed against an acid reacting layer by a writing operation.

EXAMPLE 4

15 parts of 1,2,4-trimethylquinoxalonium-methylsulfate and 17.2 parts of β-oxynaphthaldehyde are heated under reflux for 18 hours in 70 ml of ethanol to which 20 parts of piperidine have been added. The product which precipitates on cooling is filtered off and dissolved in benzene for further purification, clarification being effected with animal charcoal. The benzene phase is concentrated and the product is precipitated therefrom in the form of colorless crystals by the addition of light petroleum. The thus obtained 1,4-dimethyl-3-oxo-spiro[1,2,3,4-tetrahydroquinoxaline-2,2'-(2'H)naphtho[2,1-b]pyran] melts at from 122° to 124°C.

Microcapsules containing this compound as dye-forming component give a violet coloration when pressed against an acid reacting layer by a writing operation.

EXAMPLE 5

30 parts of 1,2,4-trimethylquinoxalonium-methylsulfate and 23 parts of 2-hydroxy-3-carbomethoxy-1-naphthaldehyde are heated under reflux in 80 parts of ethanol for 7 hours. As described in Example 2, the isolated dye is further treated with ammonia and benzene until the color disappears completely.

There are obtained 27 parts of 1,4-dimethyl3-oxo-5'-carbomethoxy-spiro[1,2,3,4-tetrahydroquinoxaline-2,2'-(2'H)-naphtho [2,1-b]pyran] in the form of slightly yellow crystals having an m.p. of 122°–124°C.

A violet coloration is obtained when this compound is dissolved in chlorinated diphenyl and enclosed in microcapsules and the latter are ruptured against an acid reacting layer by a writing operation.

EXAMPLE 6

10 parts of 1,2-dimethyl-4-(β-cyanoethyl)-quinoxaloniummethylsulfate and 6 parts of diethylaminosalicylaldehyde are heated under reflux for 1 hour in 50 parts of ethanol. The dye is isolated and stirred with ammonia and benzene as described in Example 2 until the color disappear completely. The benzene solution is concentrated and precipitation of 1-methyl-3-oxo-4-(β-cyanoethyl)7'-diethylamino-spiro[1,2,3,4-tetrahydroquinoxaline-2,2'-(2'H,1')benzopyran] in the form of colorless crystals is effected by the addition of light petroleum, the precipitated produce having an m.p. of 144°–146°C. The yield is 6.5 parts.

Microcapsules containing the above compound give a blue coloration when ruptured against an acid reacting layer by a writing operation.

EXAMPLE 7

34 parts of 1,2-dimethyl-4-(β-cyanoethyl)-quinoxalonium-methylsulfate and 12 parts of salicylaldehyde are heated under reflux in 100 parts of alcohol for 4 hours. The dye is isolated and, as described in Example 2, decolorized with ammonia.

There are obtained 20 parts of 1-methyl-3-oxo-4-(β-cyanoethyl)-spiro[1,2,3,4-tetrahydroquinoxaline-2,2'-(2'H,1')benzopyran], m.p. 169°C.

When contacted with an acid reacting substance, this compound gives a red coloration.

EXAMPLE 8

34 parts of 1,2-dimethyl-4-(β-cyanoethyl)-quinoxaloniummethyl-sulfate and 17.2 parts of β-oxynaphthaldehyde are heated under reflux in 100 parts of alcohol for 4 hours. The isolated dye is stirred with ammonia as in Example 2 until the color disappears completely. The addition of light petroleum to the concentrated benzene solution gives 30 parts of 1-methyl-3-oxo-4-(β-cyanoethyl)-spiro[1,2,3,4-tetrahydroquinoxaline-2,2'-(2'H)-naphtho[2,1-b]pyran] in the form of colorless crystals, m.p. 207°–208°C.

Microcapsules containing the above compound give a violet coloration when pressed against an acid reacting layer by a writing operation.

EXAMPLE 9

24 parts of 1,2,4-trimethylquinoxaloniummethylsulfate and 17 parts of dimethylaminosalicylaldehyde are heated under reflux in 170 parts of alcohol for 1 hour. Decolorizing of the isolated dye is effected as described in Example 2. The yield of colorless 1,4-dimethyl-3-oxo-7'-dimethylamino-sprio[1,2,3,4,-tetrahydroquinoxaline-2,2'-(2'H,1')benzopyran], m.p. 172°–174°C, is 15 parts.

Microcapsules containing this dye-forming component give a bluish violet coloration when pressed against an acid reacting layer by a writing operation.

EXAMPLE 10

10 parts of 1,2-dimethyl-4-ethylquinoxaloniummethylsulfate and 6 parts of dimethylaminosalicyclaldehyde are heated under reflux in 40 parts of alcohol for 2 hours. On completion of the condensation, the dye is isolated and decolorized as in Example 2. There are obtained colorless crystals of 1-methyl-3-oxo-4-ethyl-7'-dimethylamino-spiro[1,2,3,4-tetrahydroquinoxaline-2,2'-(2'H,1')-benzopyran], m.p. 120°–122°C.

A bluish violet coloration is obtained when this compound is contacted by an acid reacting substance.

We claim:
1. Spiropyrans of the formula:

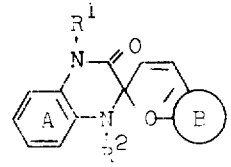

in which
R$^1$ is hydrogen, alkyl, cyanoalkyl, carboalkoxyalkyl or methoxyalkyl each of from 1 to 6 carbon atoms or phenyl,
R$^2$ is alkyl of from 1 to 4 carbon atoms,
A is a benzene nucleus optionally mono substituted by methyl, chlorine, bromine or alkoxy or from 1 to 4 carbon atoms, and
B is a benzene or naphthalene nucleus mono substituted by chlorine, bromine, nitro, alkyl, alkoxy or dialkylamino having from 1 to 5 carbon atoms in each alkyl group.

2. Spiropyrans as claimed in claim 1, wherein R$^1$ and R$^2$ each denotes methyl.

3. Spiropyrans as claimed in claim 1, wherein the aromatic nucleus B is a benzene nucleus substituted by diethylamino.

4. The spiropyran of the formula:

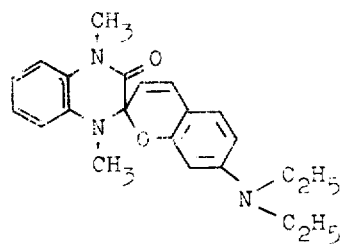

* * * * *